(12) United States Patent
Maeda et al.

(10) Patent No.: US 8,998,216 B2
(45) Date of Patent: Apr. 7, 2015

(54) VEHICLE

(71) Applicant: Yamaha Hatsudoki Kabushiki Kaisha, Iwata-shi, Shizuoka (JP)

(72) Inventors: Kenichi Maeda, Newnan, GA (US); Yasuhiro Suzuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/178,988

(22) Filed: Feb. 12, 2014

(65) Prior Publication Data
US 2014/0224564 A1 Aug. 14, 2014

Related U.S. Application Data

(60) Provisional application No. 61/764,697, filed on Feb. 14, 2013.

(51) Int. Cl.
*B60K 5/00* (2006.01)
*B60G 21/055* (2006.01)
*B62D 21/18* (2006.01)

(52) U.S. Cl.
CPC .............. *B60K 5/00* (2013.01); *B60G 21/055* (2013.01); *B62D 21/183* (2013.01); *B60K 2005/003* (2013.01); *B60Y 2200/23* (2013.01)

(58) Field of Classification Search
CPC .......... B62D 21/183; B60Y 2200/124; B60Y 2200/23; B60K 5/00; B60K 2005/003; B60G 21/055; B60G 2202/135

USPC ........................................ 180/292; 280/5.511
See application file for complete search history.

(56) References Cited

U.S. PATENT DOCUMENTS

| | | | | |
|---|---|---|---|---|
| 4,217,970 | A * | 8/1980 | Chika | 180/298 |
| 7,819,220 | B2 * | 10/2010 | Sunsdahl et al. | 180/312 |
| 7,950,486 | B2 * | 5/2011 | Van Bronkhorst et al. | 180/89.11 |
| 8,251,170 | B2 * | 8/2012 | Miura | 180/68.3 |
| 8,613,336 | B2 * | 12/2013 | Deckard et al. | 180/68.3 |
| 8,746,719 | B2 * | 6/2014 | Safranski et al. | 280/124.148 |
| 2012/0217078 | A1 | 8/2012 | Kinsman et al. | |

* cited by examiner

*Primary Examiner* — Paul N Dickson
*Assistant Examiner* — Timothy Wilhelm
(74) *Attorney, Agent, or Firm* — Keating & Bennett, LLP

(57) ABSTRACT

A vehicle includes a pair of rear wheels, a frame portion, a roll-over protection cage supported by the frame portion, a pair of suspension assemblies at a rear region of the frame portion to suspend the pair of rear wheels, an engine supported by the frame portion, with at least a portion of the engine being at a more rearward position than the roll-over protection cage, and a rear stabilizer connecting the pair of suspension assemblies to each other. Each of the pair of suspension assemblies includes an arm portion supported pivotably by the frame portion, and a shock absorber which connects the arm portion and the frame portion to each other. The rear stabilizer overlaps the engine in a plan view, passing in front of the pair of shock absorbers and below the engine.

6 Claims, 15 Drawing Sheets

F I G. 1
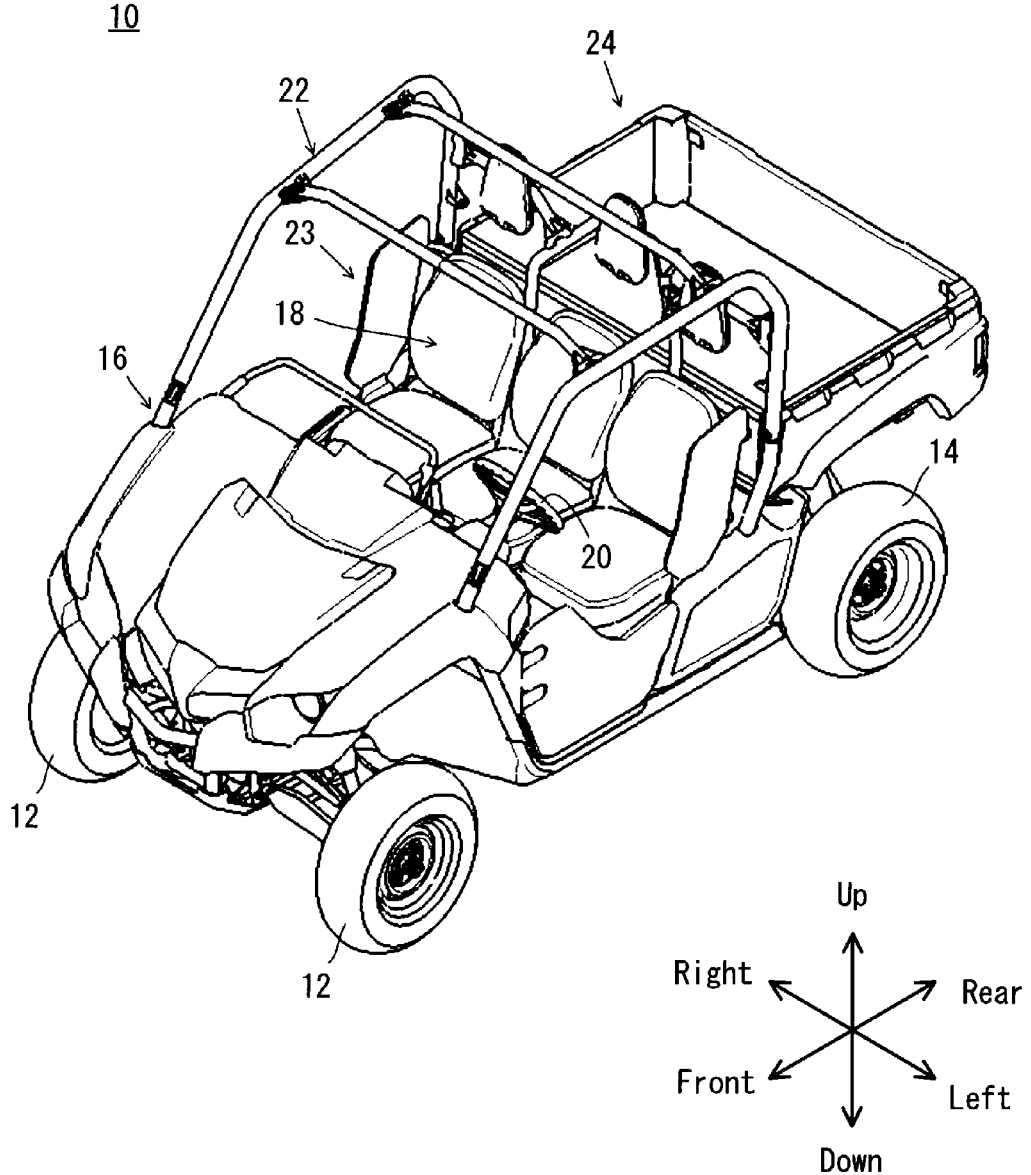

10

VEHICLE

BACKGROUND OF THE INVENTION

1. Field of the Invention

The present invention relates to vehicles, and more specifically to a vehicle including a rear stabilizer.

2. Description of the Related Art

Conventionally, there is proposed a variety of off-road vehicles (e.g., Recreational Off-Highway Vehicles (ROVs)). For example, US2012/0217078A1 discloses a vehicle which includes a pair of front wheels, a pair of rear wheels, a frame, and an engine. The rear wheels are supported by the frame via suspensions.

The suspensions which support the pair of rear wheels include a pair of upper alignment arms, a pair of lower alignment arms, and a pair of shock absorbers. The pair of lower alignment arms are connected to each other by a torsion bar. In this vehicle, the torsion bar serves as a rear stabilizer.

In the vehicle disclosed in US2012/0217078A1, the torsion bar passes behind the pair of shock absorbers. For this reason, the torsion bar can be exposed to external forces from the rear of the vehicle. An external force applied to the torsion bar can reduce the rear stabilizer function of the torsion bar.

One way to protect the torsion bar from external forces is to dispose the torsion bar in front of the pair of shock absorbers. However, in the vehicle disclosed in US2012/0217078A1, it is not possible to dispose the torsion bar in front of the pair of shock absorbers since the engine blocks the route for the torsion bar. In order to dispose the torsion bar in front of the pair of shock absorbers, the engine and the pair of shock absorbers must be spaced from each other in a fore-aft direction. In this case, the vehicle's dimension in the fore-aft direction must be increased.

SUMMARY OF THE INVENTION

Therefore, preferred embodiments of the present invention provide a vehicle in which the rear stabilizer has a reduced chance of exposure to eternal forces.

According to a preferred embodiment of the present invention, a vehicle includes a pair of rear wheels; a frame portion; a roll-over protection cage supported by the frame portion; a pair of suspension assemblies at a rear region of the frame portion to suspend the pair of rear wheels; an engine supported by the frame portion, with at least a portion of the engine being at a more rearward position than the roll-over protection cage; and a rear stabilizer connecting the pair of suspension assemblies to each other. Each of the pair of suspension assemblies includes an arm portion supported pivotably by the frame portion, and a shock absorber connecting the arm portion and the frame portion to each other. With the above arrangement, the rear stabilizer overlaps the engine in a plan view, passing in front of the pair of shock absorbers and below the engine.

According to a preferred embodiment of the present invention, the rear stabilizer passes in front of the pair of shock absorbers. In this case, a portion of the rear stabilizer which is in front of the pair of shock absorbers is sufficiently spaced away, in a forward direction, from a rearward end region of the vehicle. Thus, the arrangement reduces chances for the rear stabilizer to be exposed to external forces from behind. The rear stabilizer is disposed to overlap the engine in a plan view. In this case, there is no need for the rear stabilizer and the engine to be separated away from each other in a fore-aft direction, and therefore there is no need to increase a fore-aft dimension of the vehicle. As a result, the vehicle is compact and significantly reduces or prevents exposure of the rear stabilizer to external forces. The rear stabilizer passes below the engine. This arrangement significantly reduces or prevents exposure of the rear stabilizer to external forces from above while the arrangement also reduces layout complications above the engine.

Preferably, the rear stabilizer is at a higher position than a lower end of the engine. In this case, the rear stabilizer is sufficiently spaced away from the ground. Thus, this arrangement significantly reduces or prevents exposure of the rear stabilizer to external forces from below.

Further preferably, the engine includes a cylinder portion and a transmission case integrated with the cylinder portion. With this structural arrangement, the rear stabilizer is behind the transmission case, at a lower position than an upper end of the transmission case and at a higher position than a lower end of the transmission case. In this case, the transmission case, which is generally wider than the cylinder portion, is in front of the rear stabilizer, and significantly reduces or prevents exposure of the rear stabilizer to external forces from ahead.

Further, preferably, the vehicle further includes a propeller shaft extending in a fore-aft direction in a more rearward region than the engine and rotated by a driving force from the engine; and a pair of drive shafts extending in a width direction of the vehicle and transmitting rotation from the propeller shaft to the pair of rear wheels. With this arrangement, the rear stabilizer passes above the propeller shaft. In this case, the rear stabilizer is sufficiently spaced away from the ground. Thus, this arrangement significantly reduces or prevents exposure of the rear stabilizer to external forces from below.

Preferably, the rear stabilizer includes a torsion bar portion extending in a width direction of the vehicle; a first end portion connecting an end region of the torsion bar portion to one of the suspension assemblies; and a second end portion connecting another end region of the torsion bar portion to the other suspension assembly. With this arrangement, the torsion bar portion overlaps the engine in a plan view, passing below the engine. The torsion bar portion undergoes a twisting motion when it is operating. An amount of positional change of the torsion bar portion is generally smaller than an amount of positional change of the first end portion and an amount of positional change of the second end portion. Therefore, in cases where the torsion bar portion is disposed below the engine, it is easy to locate the torsion bar portion close to the engine. In other words, this arrangement makes it possible to minimize a clearance between the rear stabilizer and the engine in a fore-aft direction. Therefore, there is no need to increase a fore-aft dimension of the vehicle.

Further preferably, the frame portion includes a pair of support frame portions supporting the pair of arm portions and extending in an up-down direction. With this arrangement, the torsion bar portion is supported by the pair of support frame portions. In this case, the support frame portions can be used to support the arm portions, and to support the torsion bar portion as well. Therefore, there is no need for any additional frame elements to support the torsion bar portion. This arrangement leads to a simple configuration of the frame portion.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a perspective view of a vehicle according to a preferred embodiment of the present invention.

DETAILED DESCRIPTION OF THE PREFERRED EMBODIMENTS

Figure 2:
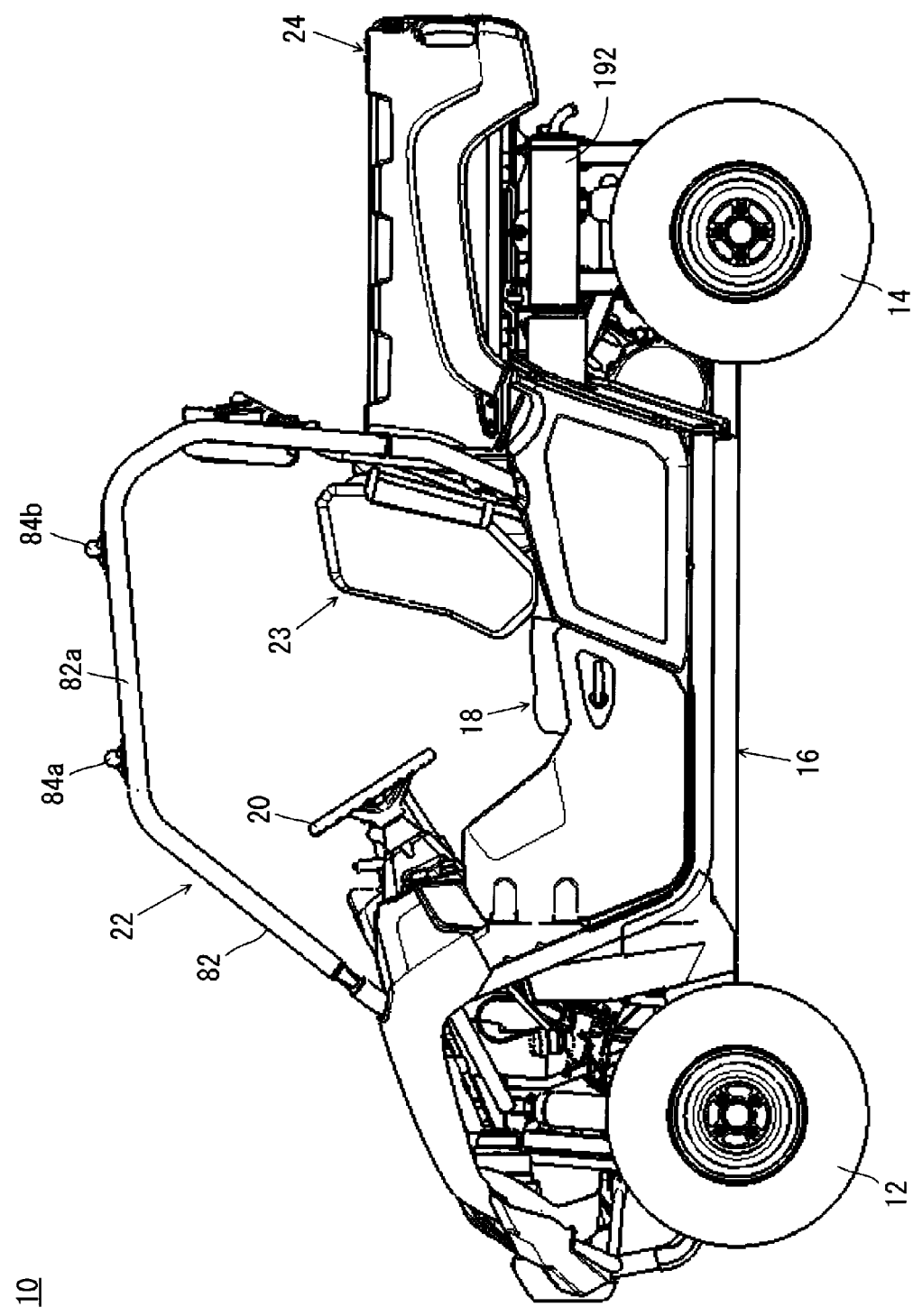
FIG. 2 is a side view of the vehicle.

Hereinafter, preferred embodiments of the present invention will be described with reference to the drawings. It is noted that the terms front and rear, right and left, up and down as used in the embodiments of the present invention are determined from the driver's position on a seat 18a of a vehicle 10, with the driver facing toward a steering wheel 20.

Referring to FIG. 1 through FIG. 5, the vehicle 10 according to a preferred embodiment of the present invention preferably is a four-wheel-drive recreational off-highway vehicle (ROV), and includes a pair of front wheels 12, a pair of rear wheels 14, a frame portion 16, a seat unit 18, a steering wheel 20, a roll-over protection cage 22, a shoulder bolster portion 23 and a cargo bed 24. The frame portion 16 is supported by the pair of front wheels 12 and the pair of rear wheels 14. Referring to FIG. 6, the frame portion 16 includes a main frame portion 16a supported by the pair of front wheels 12 (see FIG. 1) and the pair of rear wheels 14 (see FIG. 1); and a seat frame portion 16b supported by the main frame portion 16a. The seat unit 18 is supported by the seat frame portion 16b.

Figure 7:
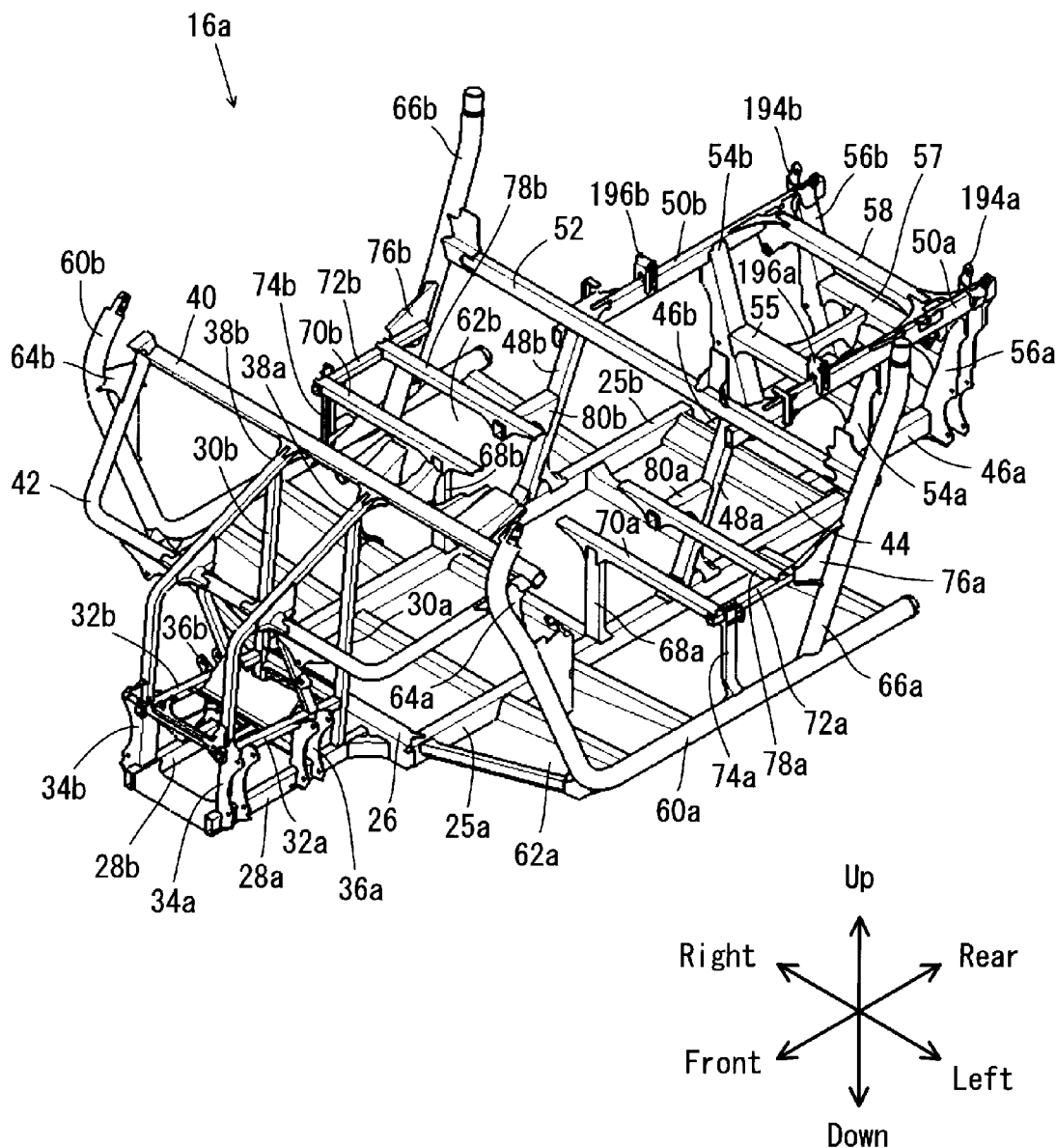
FIG. 7 is a perspective view of a main frame portion.

Referring to FIG. 7, the main frame portion 16a includes a pair of side frame portions 25a, 25b extending in a fore-aft direction. The side frame portion 25a and the side frame portion 25b are parallel or substantially parallel to each other. The side frame portion 25a and the side frame portion 25b have their respective forward ends connected to each other by a cross member 26 extending in a left-right direction (a width direction of the vehicle 10).

From the cross member 26, a pair of side frame portions 28a, 28b extend forward. In the width direction of the vehicle 10, the side frame portions 28a, 28b are on an inner side than the side frame portions 25a, 25b. The side frame portion 28a and the side frame portion 28b are parallel or substantially parallel to each other. A pair of support frame portions 30a, 30b extend upward from respective rearward regions of the side frame portions 28a, 28b.

Above the side frame portions 28a, 28b, a pair of side frame portions 32a, 32b extend forward from the support frame portions 30a, 30b. The side frame portion 32a and the side frame portion 32b are parallel or substantially parallel to each other.

The side frame portions 28a, 28b have their forward end regions connected to respective forward end regions of the side frame portions 32a, 32b by a pair of support frame portions 34a, 34b extending in an up-down direction. The side frame portions 28a, 28b have their rearward regions connected to respective rearward regions of the side frame portions 32a, 32b by a pair of support frame portions 36a, 36b extending in an up-down direction. The support frame portions 36a, 36b are at a more rearward position than the support frame portions 34a, 34b.

The side frame portions 32a, 32b have their forward end regions connected to a pair of support frame portions 38a, 38b. The support frame portions 38a, 38b extend upward from the side frame portions 32a, 32b, and then obliquely in a rearward and upward direction. The support frame portions 30a, 30b have their upper ends connected to respective rearward end regions of the support frame portions 38a, 38b. The support frame portions 38a, 38b have their rear ends connected to a cross member 40 extending in a left-right direction.

From the cross member 40, a U-shaped frame portion extends forward, below the support frame portions 38a, 38b. The U-shaped frame portion 42 includes two end regions connected to respective end regions of the cross member 40. The U-shaped frame portion 42 has an intermediate portion connected to the support frame portions 38a, 38b.

The side frame portion 25a and the side frame portion 25b have their respective rearward end regions connected to each other by a cross member 44 extending in a left-right direction. From the cross member 44, a pair of side frame portions 46a, 46b extend rearward. In the width direction of the vehicle 10, the side frame portions 46a, 46b are on an inner side than the side frame portions 25a, 25b. The side frame portion 46a and the side frame portion 46b are parallel or substantially parallel to each other.

At a more forward position than the cross member 44, a pair of support frame portions 48a, 48b extend obliquely in an upward and rearward direction from the pair of side frame portions 25a, 25b. At a higher position than the side frame portions 46a, 46b, a pair of side frame portions 50a, 50b extend in a fore-aft direction. The side frame portion 50a and the side frame portion 50b are parallel or substantially parallel to each other. In the width direction of the vehicle 10, the side frame portions 50a, 50b are on an outer side than the side frame portions 46a, 46b. The side frame portions 50a, 50b have their forward end regions connected to respective upper end regions of the support frame portions 48a, 48b. The support frame portions 48a, 48b have their upper ends connected to a cross member 52 extending in a left-right direction.

Referring to FIG. 6 and FIG. 7, the side frame portions 46a, 46b and the side frame portions 50a, 50b are connected to each other by a pair of support frame portions 54a, 54b which extend in an up-down direction and a pair of support frame portions 56a, 56b which extend in an up-down direction. The support frame portions 54a, 54b are at a more forward position than the support frame portions 56a, 56b. The support frame portion 54a and the support frame portion 54b are connected to each other by a cross member 55 extending in a left-right direction. The support frame portion 56a and the support frame portion 56b are connected to each other by a cross member 57 extending in a left-right direction. The side frame portion 50a and the side frame portion 50b are connected to each other by a cross member 58 extending in a left-right direction. The cross member 58 is at a position which is more rearward than the support frame portions 54a, 54b and more forward than the support frame portions 56a, 56b.

In the width direction of the vehicle 10, there is provided a pair of L-shaped or substantially L-shaped support frame portions 60a, 60b on respective outer sides of the side frame portions 25a, 25b. The support frame portion 60a is connected to the side frame portion 25a via a plate frame portion 62a, whereas the support frame portion 60b is connected to the side frame portion 25b via a plate frame portion 62b.

Referring to FIG. 7, the support frame portions 60a, 60b have their upper regions connected to two end regions of the U-shaped or substantially U-shaped frame portion 42 via connecting members 64a, 64b. A pair of support frame portions 66a, 66b extend obliquely in an upward and rearward direction from rearward regions of the support frame portions 60a, 60b. The support frame portions 66a, 66b have their substantially intermediate regions connected to two end regions of the cross member 52.

A pair of support frame portions 68a, 68b extend upward from substantially intermediate regions of the side frame portions 25a, 25b. A pair of support frame portions 70a, 70b extend in a left-right direction, being supported by upper ends of the support frame portions 68a, 68b. The support frame portion 70a has an end region (left end region in the present preferred embodiment) connected to a forward end region of a support frame portion 72a which extends in a fore-aft direction, whereas the support frame portion 70b has an end region (right end region in the present preferred embodiment) connected to a forward end region of a support frame portion 72b which extends in a fore-aft direction.

The support frame portion 72a has a forward region connected to the support frame portion 60a by a support frame portion 74a which extends in an up-down direction, whereas the support frame portion 72b has a forward region connected to the support frame portion 60b by a support frame portion 74b which extends in an up-down direction. The support frame portion 72a has a rearward region connected to the support frame portion 66a via a connecting member 76a, whereas the support frame portion 72b has a rearward region connected to the support frame portion 66b via a connecting member 76b.

Behind the support frame portion 70a, a support frame portion 78a is parallel or substantially parallel to the support frame portion 70a, whereas behind the support frame portion 70b, a support frame portion 78b is parallel or substantially parallel to the support frame portion 70b. The support frame portion 78a has an end region (left end region in the present preferred embodiment) connected to the support frame portion 72a, whereas the support frame portion 78b has an end region (right end region in the present preferred embodiment) connected to the support frame portion 72b.

A pair of support frame portions 80a, 80b extend forward from substantially intermediate regions of the support frame portions 48a, 48b. The support frame portions 80a, 80b have their forward end regions connected to the support frame portions 78a, 78b.

Referring to FIG. 6 and FIG. 7, the seat unit 18 is supported by the support frame portions 70a, 70b, 78a, 78b of the main frame portion 16a via the seat frame portion 16b. The seat unit 18 includes seats 18a, 18b and 18c, and headrest portions 19a, 19b and 10c (see FIG. 3 through FIG. 5). Referring to FIG. 1, the steering wheel 20 is in front of the seat 18a of the seat unit 18. The roll-over protection cage 22 covers the seat unit 18 and the steering wheel 20. The roll-over protection cage 22 is supported by the frame portion 16.

Figure 8:
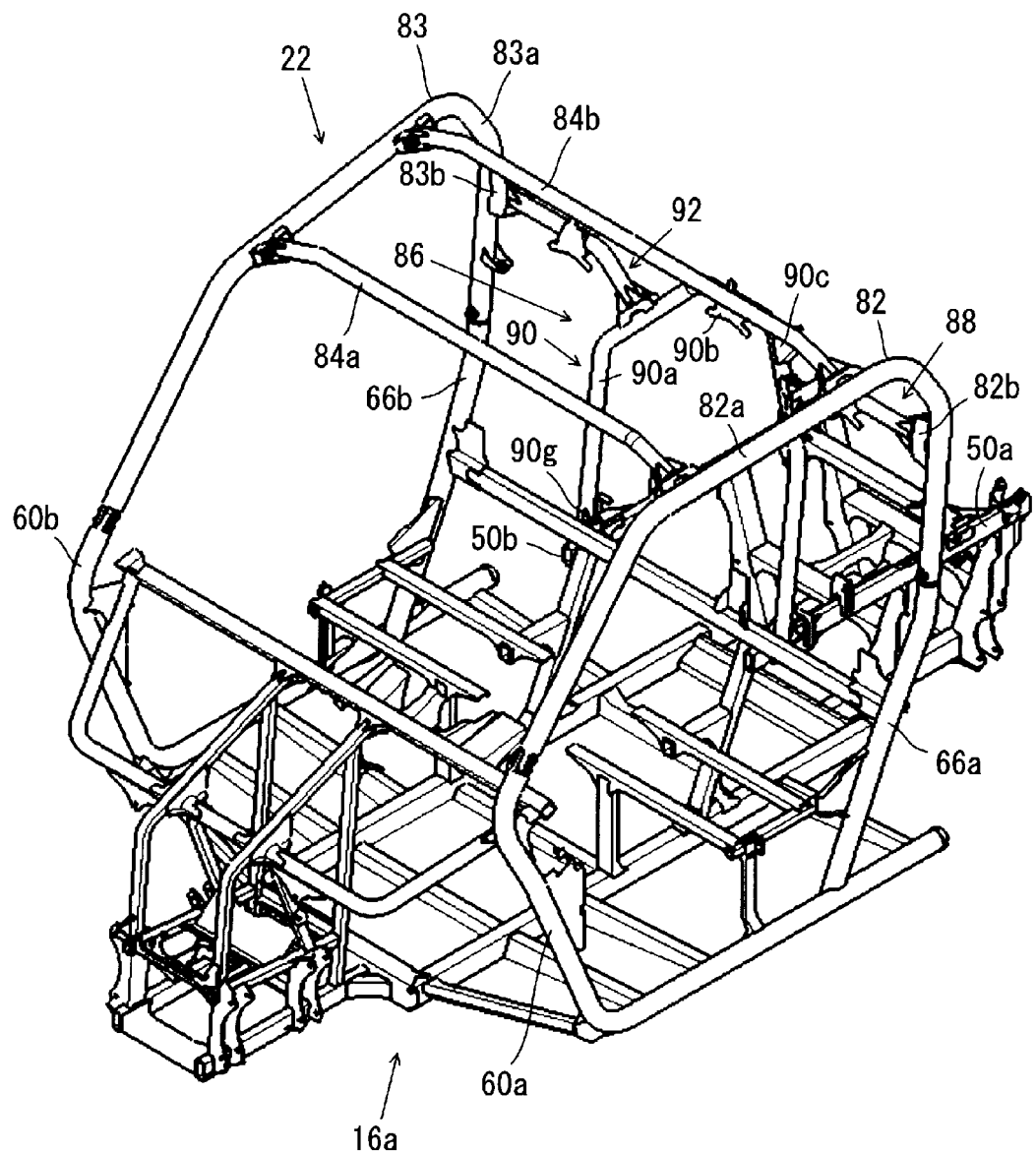
FIG. 8 is a perspective view of the main frame portion and the roll-over protection cage.

Referring to FIG. 8, the roll-over protection cage 22 includes a pair of side cage members 82, 83 extending in a fore-aft direction; a pair of roof members 84a, 84b extending in a left-right direction; and a cross member portion 86 extending in a left-right direction.

The side cage member 82 includes a main body portion 82a which has a shape of an inverted letter of U or a shape substantially of an inverted letter of U, in a side view; and a connecting portion 82b at a rearward region of the main body portion 82a. The connecting portion 82b protrudes inward (rightward in the present preferred embodiment) from the main body portion 82a in the width direction of the vehicle 10. The side cage member 83 includes a main body portion 83a which has a shape of an inverted letter of U or a shape substantially of an inverted letter of U, in a side view; and a connecting portion 83b at a rearward region of the main body portion 83a. The connecting portion 83b protrudes inward (leftward in the present preferred embodiment) from the main body portion 83a in the width direction of the vehicle 10.

The main body portions 82a, 83a are supported by the frame portion 16. More specifically, the main body portion 82a has an end region (forward end region in the present preferred embodiment), which is connected to an upper end region of the support frame portion 60a; and the main body portion 82a has another end region (rearward end region in the present preferred embodiment), which is connected to an upper end region of the support frame portion 66a. The main body portion 82a is fixed to the support frame portions 60a, 66a with, e.g., fasteners (such as bolts and nuts). Likewise, the main body portion 83a has an end region (forward end region in the present preferred embodiment), which is connected to an upper end region of the support frame portion 60b; and the main body portion 83a has another end region (rearward end region in the present preferred embodiment), which is connected to an upper end region of the support frame portion 66b. The main body portion 83a is fixed to the support frame portions 60b, 66b with, e.g., fasteners (such as bolts and nuts).

The roof members 84a, 84b connect an upper region of the side cage member 82 to an upper region of the side cage member 83. The roof member 84b is at a more rearward position than the roof member 84a. The roof member 84b is at a higher position than the seat unit 18.

Figure 3:
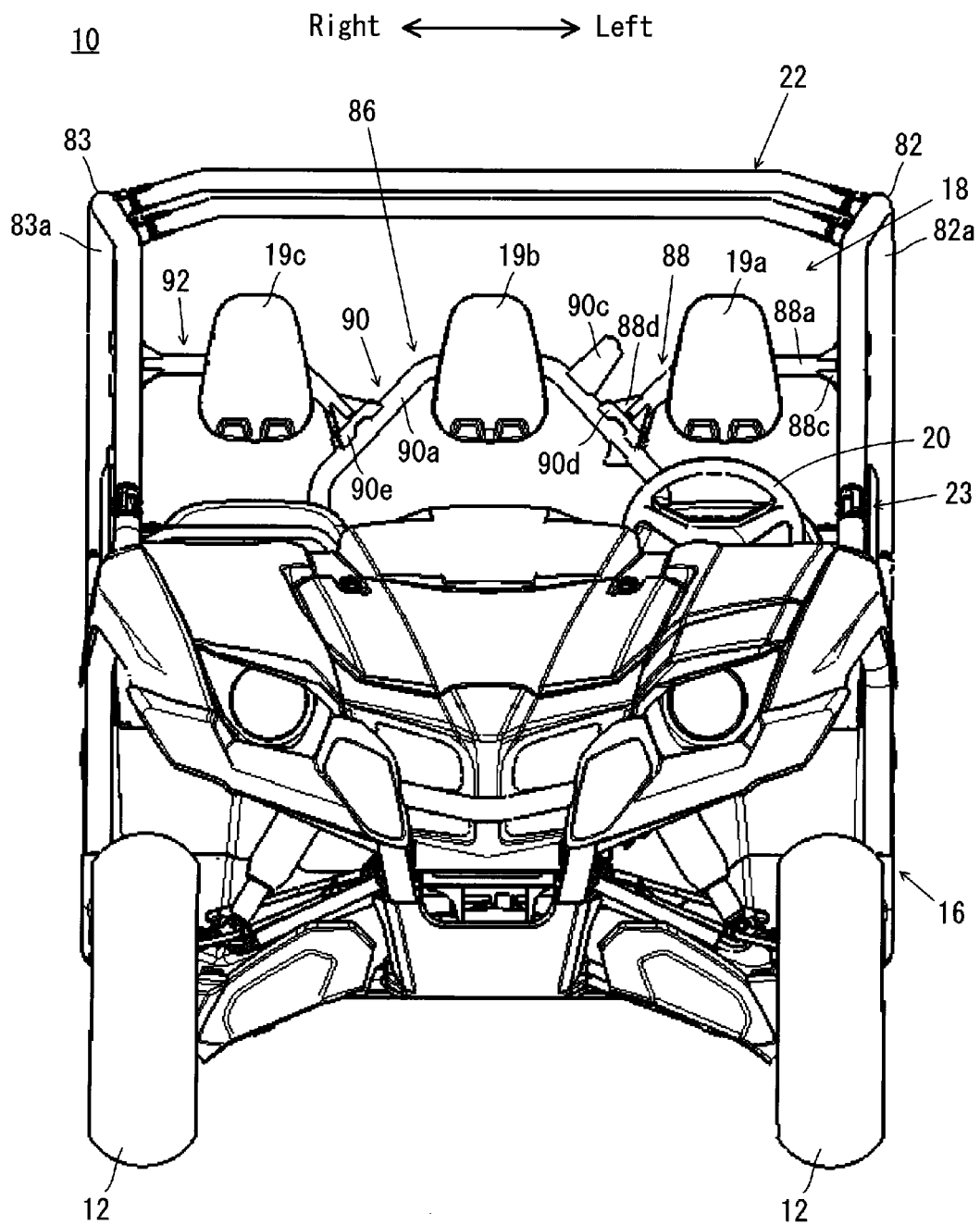
FIG. 3 is a front view of the vehicle.
Figure 4:
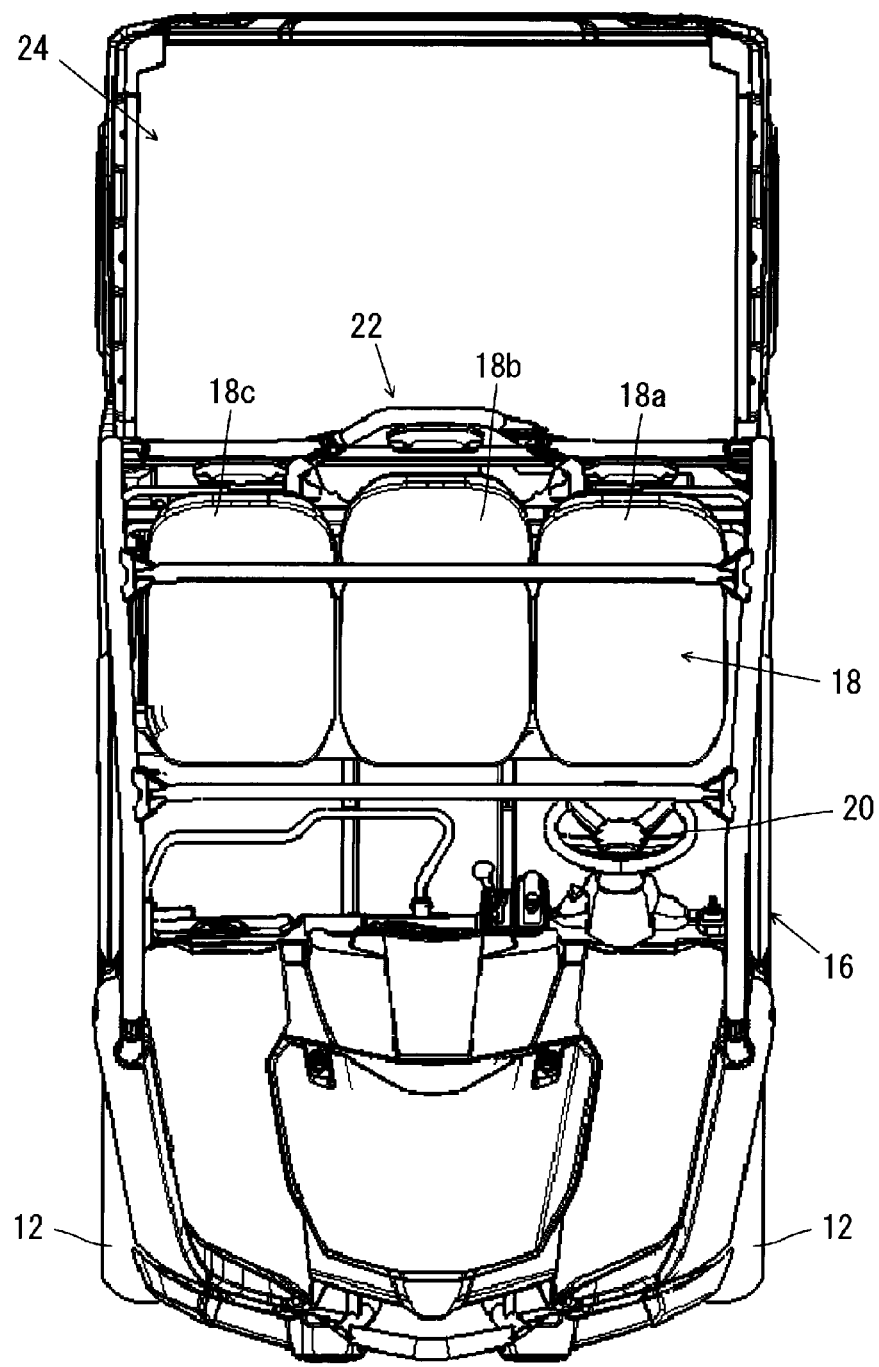
FIG. 4 is a plan view of the vehicle.
Figure 5:
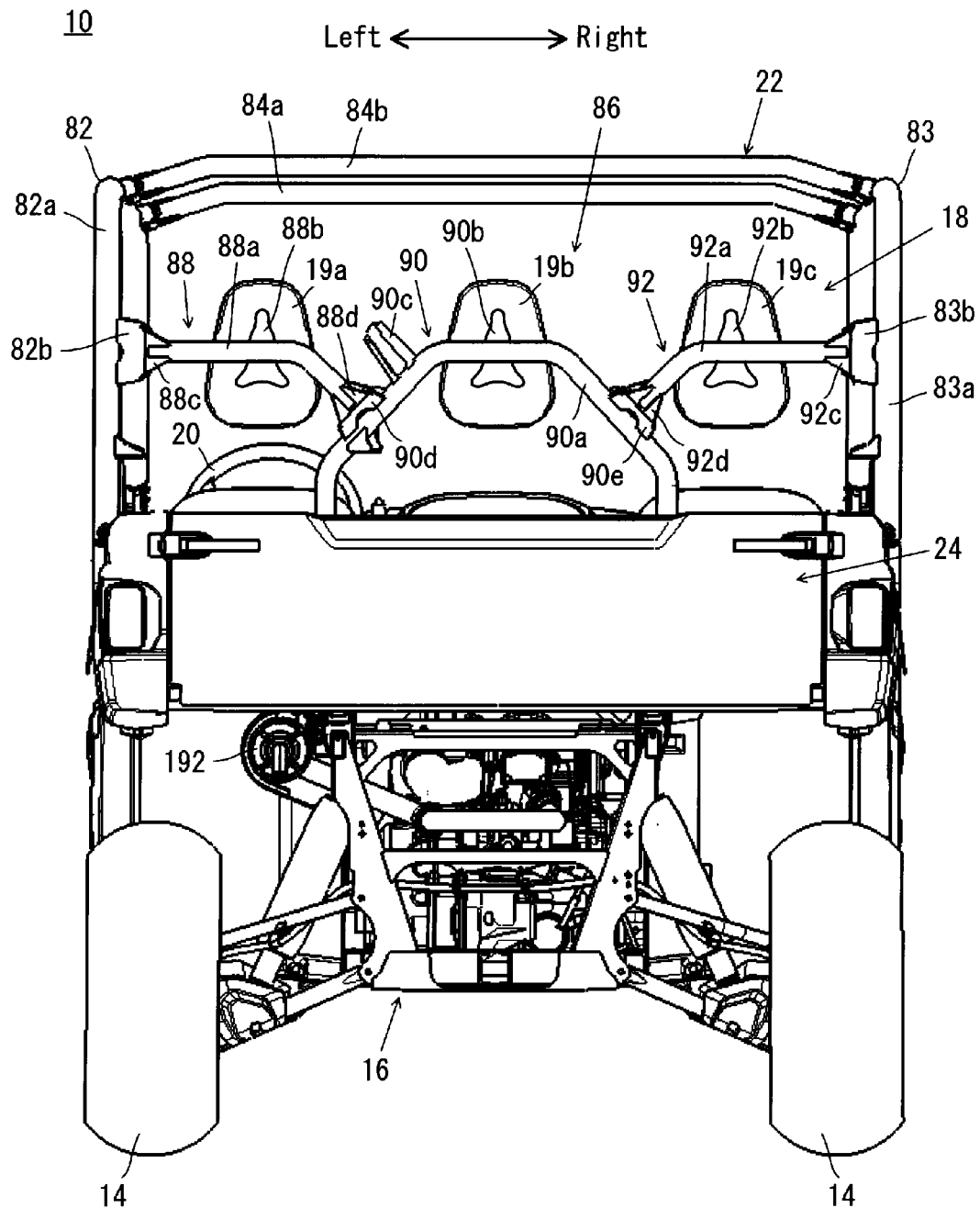
FIG. 5 is a rear view of the vehicle.
Figure 6:
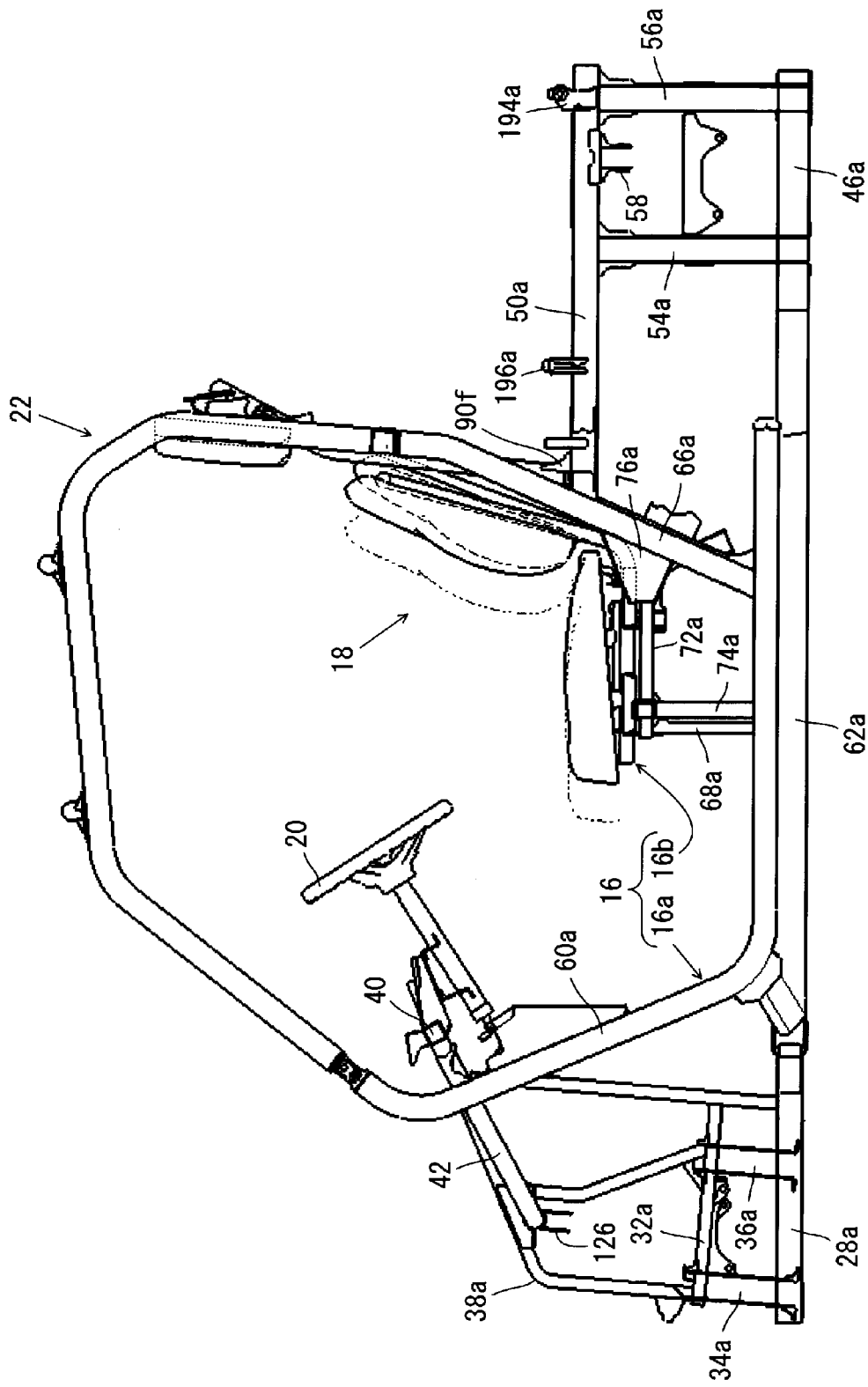
FIG. 6 is a side view showing a frame portion, a seat unit, a steering wheel and a roll-over protection cage.

Referring to FIG. 3, FIG. 5 and FIG. 8, the cross member portion 86 includes a support member 88, a support member 90 and a support member 92. The support member 90 is at an intermediate portion in the width direction of the vehicle 10, the support member 88 connects the support member 90 and the side cage member 82 to each other, and the support member 92 connects the support member 90 and the side cage member 83 to each other.

Referring to FIG. 5, the support member 88 includes a main body portion 88a extending in a left-right direction; a mounting portion 88b fixed to an intermediate region of the main body portion 88a; a connecting portion 88c fixed to an end region (left end region in the present preferred embodiment) of the main body portion 88a; and a connecting portion 88d fixed to another end region (right end region in the present preferred embodiment) of the main body portion 88a. The headrest portion 19a of the seat unit 18 is attached to the mounting portion 88b. The connecting portion 88c is connected detachably from/attachably to the connecting portion 82b of the side cage member 82. Specifically, the connecting portion 88c is connected to the connecting portion 82b of the side cage member 82 with unillustrated fasteners (such as bolts and nuts), for example. The connecting portion 88d is connected to a connecting portion 90d, which will be described later, of the support member 90 with unillustrated fasteners (such as bolts and nuts).

Referring to FIG. 5 and FIG. 8, the support member 90 includes a main body portion 90a which has a shape of an inverted letter of U or a shape substantially of an inverted letter of U, in a front view; a mounting portion 90b located at an upper end region, i.e., an intermediate region, of the main body portion 90a; and a mounting portion 90c which extends obliquely upward from the main body portion 90a on a side closer to the support member 88 when viewed from the mounting portion 90b.

Referring to FIG. 5, the headrest portion 19b of the seat unit 18 is attached to the mounting portion 90b. To the mounting portion 90c, a seat belt shoulder anchor (not illustrated) for the center seat 18b, for example, is attached.

The support member 90 further includes a pair of connecting portions 90d, 90e fixed to the main body portion 90a. The connecting portion 90d is on a side closer to the support member 88 than the mounting portion 90c when viewed from the mounting portion 90b, whereas the connecting portion 90e is on a side closer to the support member 92 when viewed from the mounting portion 90b. As has been described earlier, the connecting portion 90d is connected to the connecting portion 88d of the support member 88. The connecting portion 90e is connected to a connecting portion 92d, which will be described later, of the support member 92 with unillustrated fasteners (such as bolts and nuts), for example.

Referring to FIG. 5, without going into detail, the support member 90 further includes a pair of connecting portions 90f, 90g (see FIG. 6 and FIG. 8) fixed to two end portions (lower end regions) of the main body portion 90a. The main body portion 90a has these two end regions connected detachably from/attachably to the side frame portions 50a, 50b via the pair of connecting portions 90f, 90g. Specifically, the pair of connecting portions 90f, 90g of the support member 90 are connected to the side frame portions 50a, 50b, with unillustrated fasteners (such as bolts and nuts), for example.

The support member 92 includes a main body portion 92a extending in a left-right direction; a mounting portion 92b fixed to an intermediate region of the main body portion 92a; a connecting portion 92c fixed to an end region (right end region in the present preferred embodiment) of the main body portion 92a; and a connecting portion 92d fixed to another end region (left end region in the present preferred embodiment) of the main body portion 92a. A headrest portion 19c of the seat unit 18 is attached to the mounting portion 92b. The connecting portion 92c is connected detachably from/attachably to the connecting portion 83b of the side cage member 83. Specifically, the connecting portion 92c is connected to the connecting portion 83b of the side cage member 83 with unillustrated fasteners (such as bolts and nuts), for example. As has been described earlier, the connecting portion 92d is connected to the connecting portion 90e of the support member 90.

Due to the arrangement described above, the cross member portion 86 is attached detachably from/attachably to the side frame portions 50a, 50b of the frame portion 16 and the side cage members 82, 83 of the roll-over protection cage 22.

Referring to FIG. 9 through FIG. 13, the vehicle 10 further includes a pair of suspension assemblies 94a, 94b which suspend the pair of front wheels 12 (see FIG. 1); a rotation transmission portion 96 which transmits rotation from an engine 178 (see FIG. 14, FIG. 15) to be described later to the pair of front wheels 12; a pair of suspension assemblies 98a, 98b which suspend the pair of rear wheels 14 (see FIG. 1); a rotation transmission portion 100 which transmits rotation from the engine 178 to the pair of rear wheels 14; and a rear stabilizer 102 which connects the suspension assemblies 98a, 98b to each other. The frame portion 16 (see FIG. 1) is supported by the pair of front wheels 12 and the pair of rear wheels 14 via the suspension assemblies 94a, 94b, 98a, 98b. In the present preferred embodiment, the suspension assemblies 94a, 94b, 98a, 98b preferably are double wishbone type suspension assemblies, for example.

Figure 10:
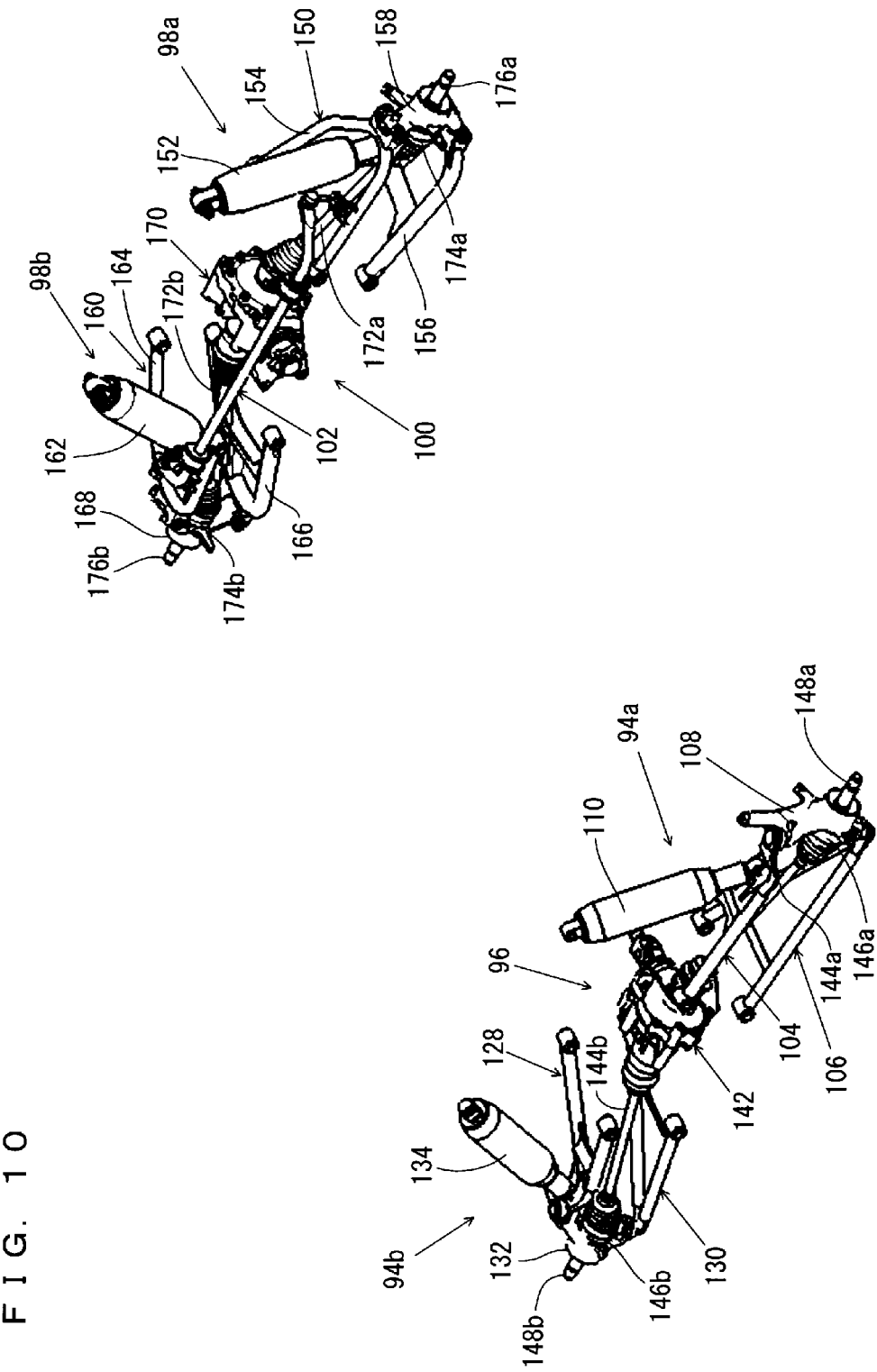
FIG. 10 is a perspective view showing the pair of suspension assemblies for front wheels and the pair of suspension assemblies for rear wheels.
Figure 11:
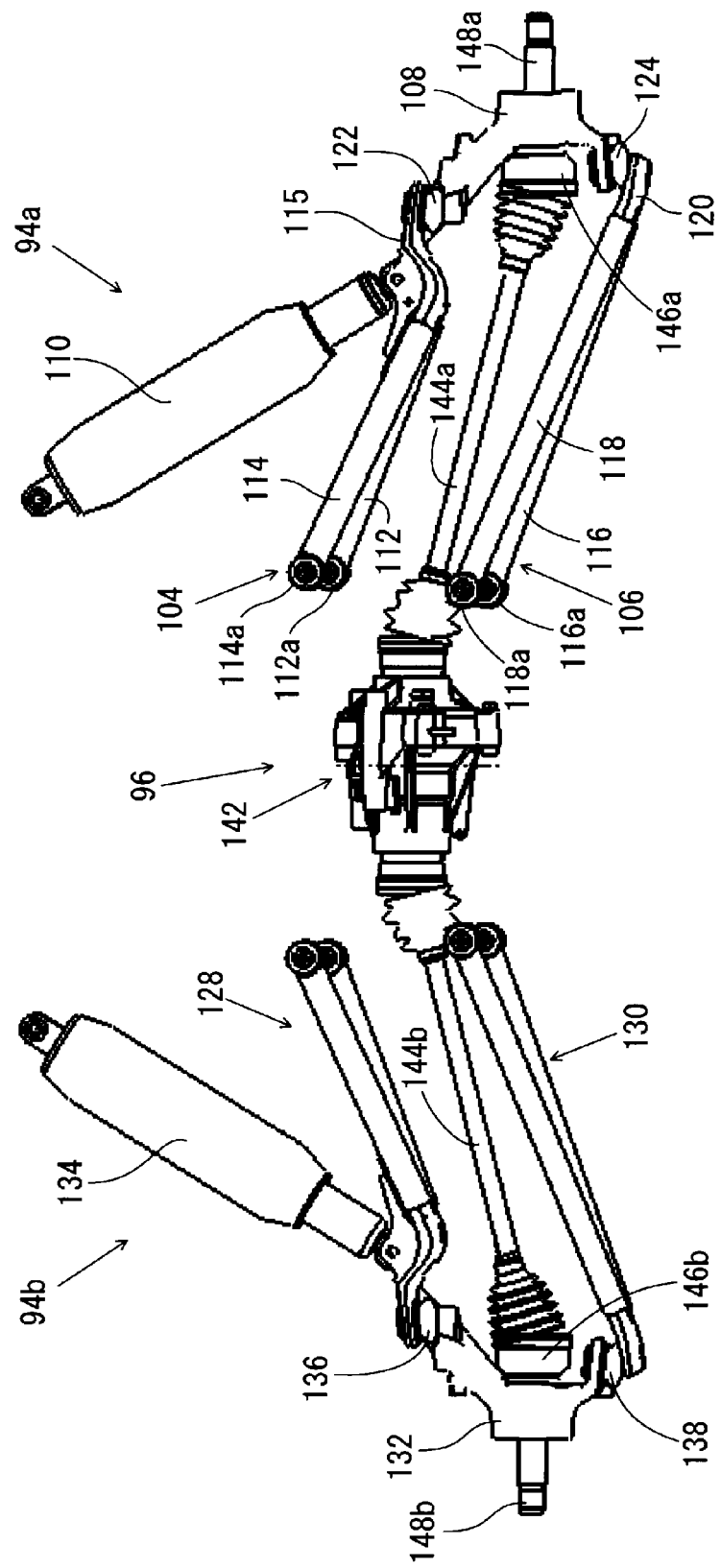
FIG. 11 is a front view showing the pair of suspension assemblies for front wheels and the rotation transmission portion for the front wheels.

Referring to FIG. 10 and FIG. 11, the suspension assembly 94a includes an upper arm 104, a lower arm 106, a knuckle arm 108 and a shock absorber 110. The upper arm 104 and the lower arm 106 are provided by A arms for example.

Referring to FIG. 11, the upper arm 104 includes a rear arm portion 112 which includes a first end portion 112a; a front arm portion 114 which includes a second end portion 114a and is at a more forward position than the rear arm portion 112; and a connecting portion 115 which connects the rear arm portion 112 and the front arm portion 114 to each other.

The first end portion 112a is an end region (right end region in the present preferred embodiment) of the rear arm portion 112, whereas the second end portion 114a is an end region (right end region in the present preferred embodiment) of the front arm portion 114. The connecting portion 115 connects another end region (left end region in the present preferred embodiment) of the rear arm portion 112 and another end region (left end region in the present preferred embodiment) of the front arm portion 114 to each other.

The lower arm 106 includes a rear arm portion 116 which includes a first end portion 116a; a front arm portion 118 which includes a second end portion 118a and is at a more forward position than the rear arm portion 116; and a connecting portion 120 which connects the rear arm portion 116 and the front arm portion 118 to each other.

The first end portion 116a is an end region (right end region in the present preferred embodiment) of the rear arm portion 116, whereas the second end portion 118a is an end region (right end region in the present preferred embodiment) of the front arm portion 118. The connecting portion 120 connects another end region (left end region in the present preferred embodiment) of the rear arm portion 116 and another end region (left end region in the present preferred embodiment) of the front arm portion 118 to each other.

Figure 9:
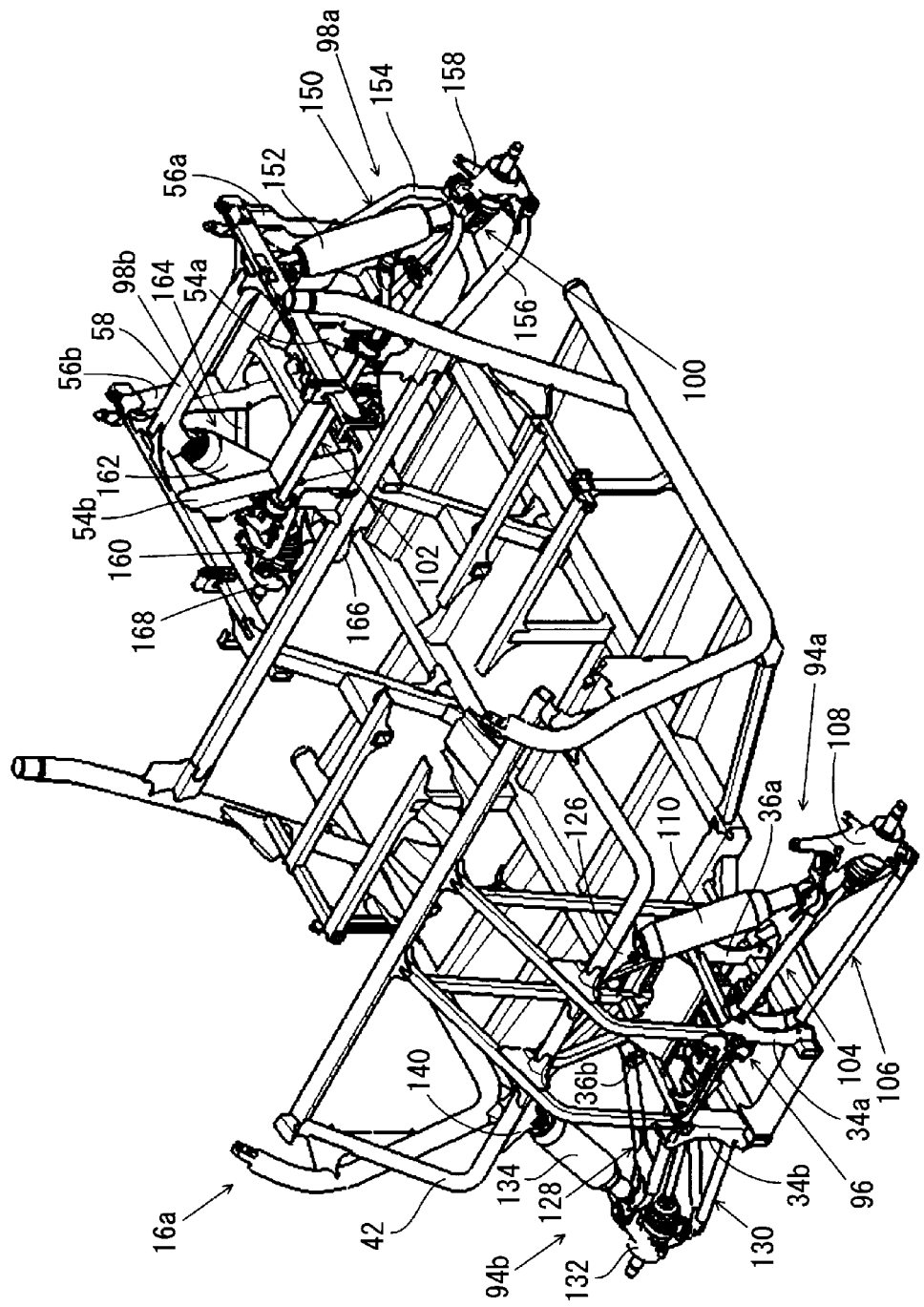
FIG. 9 is a perspective view of the main frame portion, a pair of suspension assemblies for front wheels, a rotation transmission portion for the front wheels, a pair of suspension assemblies for rear wheels, and a rotation transmission portion for the rear wheels.

Referring to FIG. 9, the upper arm 104 is supported by the support frame portions 34a, 36a pivotably in an up-down direction. More specifically, referring to FIG. 11, the first end portion 112a of the rear arm portion 112 is pivotably supported at an upper end region of the support frame portion 36a (see FIG. 9), whereas the second end portion 114a of the front arm portion 114 is pivotably supported at an upper end region of the support frame portion 34a (see FIG. 9).

Referring to FIG. 9, the lower arm 106 is supported by the support frame portions 34a, 36a pivotably in an up-down direction at a lower position than the upper arm 104. More specifically, referring to FIG. 11, the first end portion 116a of the rear arm portion 116 is pivotably supported at a lower end region of the support frame portion 36a (see FIG. 9), whereas the second end portion 118a of the front arm portion 118 is pivotably supported at a lower end region of the support frame portion 34a (see FIG. 9).

The connecting portion 115 of the upper arm 104 is connected to an upper end region of the knuckle arm 108 via a ball joint 122, whereas the connecting portion 120 of the lower arm 106 is connected to a lower end region of the knuckle arm 108 via a ball joint 124. Thus, the upper arm 104 and the lower arm 106 are pivotable in an up-down direction with respect to the knuckle arm 108. Also, the knuckle arm 108 is pivotable in a fore-aft direction with respect to the upper arm 104 and the lower arm 106.

The shock absorber 110 has a lower end region supported pivotably in a left-right direction by the upper arm 104 (the connecting portion 115). Referring to FIG. 9, the shock absorber 110 has an upper end region supported pivotably in a left-right direction by the U-shaped frame portion 42 via a support member 126. Referring to FIG. 6, the support member 126 has a shape of an inverted letter of U in a side view, and is fixed to the U-shaped frame portion 42.

Referring to FIG. 10 and FIG. 11, without going into detail, the suspension assembly 94b is symmetrical to the suspension assembly 94a in a left-right direction, and includes an upper arm 128, a lower arm 130, a knuckle arm 132, and a shock absorber 134. The knuckle arm 132 is connected to the upper arm 128 and the lower arm 130 via ball joints 136, 138.

The shock absorber 134 has a lower end region supported by the upper arm 128 pivotably in a left-right direction. Referring to FIG. 9, the shock absorber 134 has an upper end region supported pivotably in a left-right direction by the U-shaped or substantially U-shaped frame portion 42 via a support member 140. Like the support member 126, the support member 140 has a shape of an inverted letter of U or substantially a shape of an inverted letter of U in a side view, and is fixed to the U-shaped or substantially U-shaped frame portion 42.

Referring to FIG. 10 and FIG. 11, the rotation transmission portion 96 includes a differential device 142, a pair of drive shafts 144a, 144b, a pair of constant-velocity joints 146a, 146b, and a pair of axles 148a, 148b. The differential device 142 is between the suspension assembly 94a and the suspension assembly 94b in the width direction of the vehicle 10. Without going into detail, the differential device 142 is supported by the main frame portion 16a. The differential device 142 is connected to the engine 178 (see FIG. 14, FIG. 15) which will be described later, via a propeller shaft 180 (see FIG. 15) which will be described later. The drive shafts 144a, 144b connect the differential device 142 with the constant-velocity joints 146a, 146b. The constant-velocity joint 146a and the axle 148a are connected to each other and are supported rotatably by the knuckle arm 108. The constant-velocity joint 146b and the axle 148b are connected to each other and are supported rotatably by the knuckle arm 132. The axle 148a supports the left front wheel (see FIG. 1), whereas the axle 148b supports the right front wheel 12 (see FIG. 1).

The suspension assemblies 98a, 98b and the rotation transmission portion 100 can be any known components, so the suspension assemblies 98a, 98b and the rotation transmission portion 100 will be described only briefly.

Figure 12:
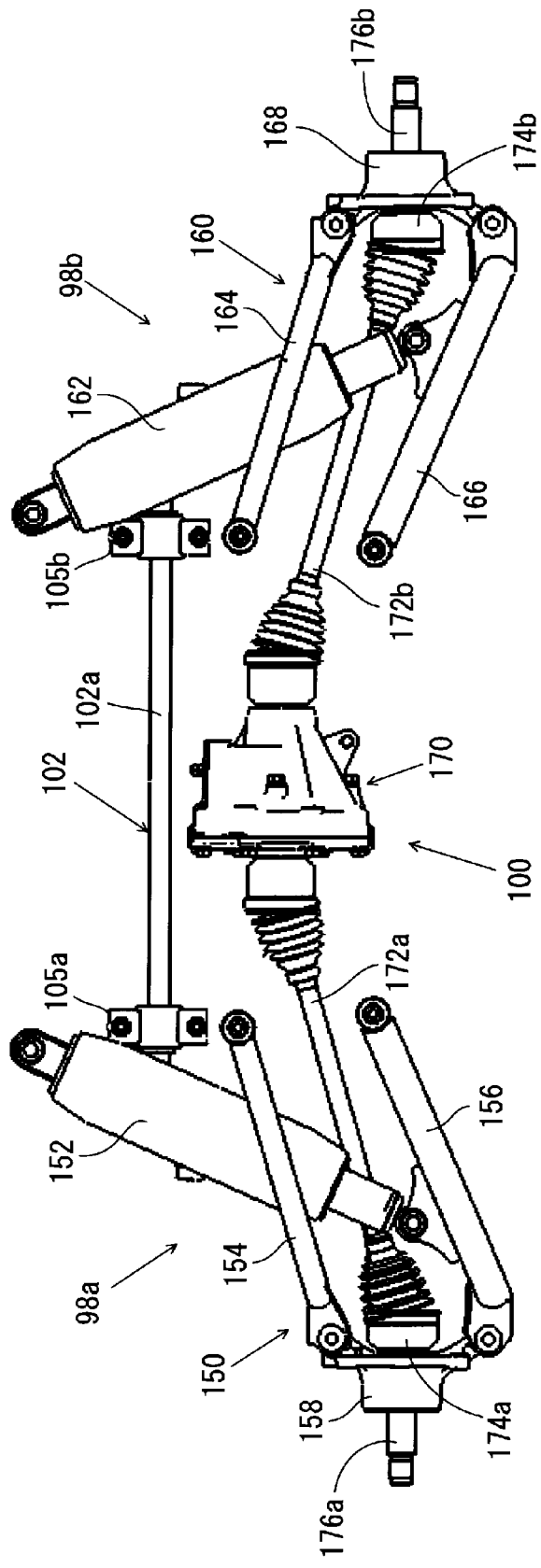
FIG. 12 is a rear view showing the pair of suspension assemblies for rear wheels, the rotation transmission portion for the rear wheels, and a rear stabilizer.
Figure 13:
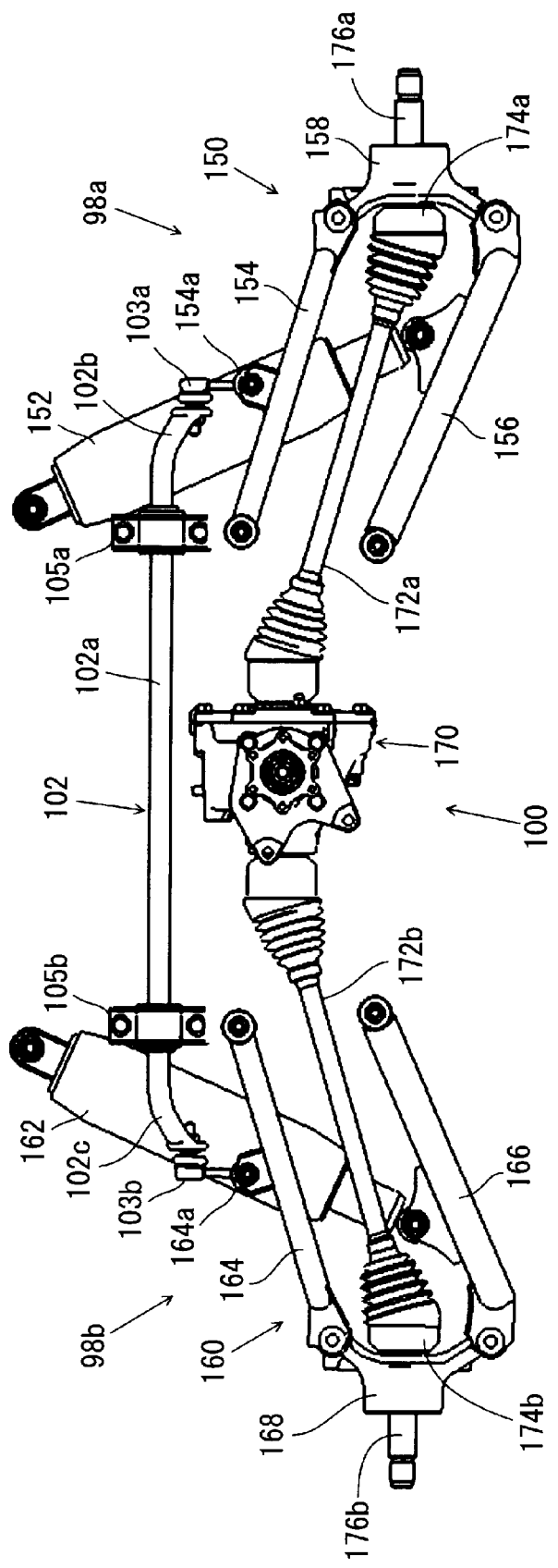
FIG. 13 is a front view showing the pair of suspension assemblies for rear wheels, the rotation transmission portion for the rear wheels, and the rear stabilizer.

Referring to FIG. 10, FIG. 12 and FIG. 13, the suspension assembly 98a includes an arm portion 150 and a shock absorber 152. In the present preferred embodiment, the arm portion 150 includes an upper arm 154, a lower arm 156 and a knuckle arm 158. Referring to FIG. 9, the upper arm 154 is supported by the support frame portions 54a, 56a pivotably in an up-down direction. The lower arm 156 is supported by the support frame portions 54a, 56a pivotably in an up-down direction at a lower position than the upper arm 154. More specifically, the upper arm 154 is supported at substantially intermediate regions in an up-down direction of the support frame portions 54a, 56a, whereas the lower arm 156 is supported by lower end regions of the support frame portions 54a, 56a. The shock absorber 152 connects the main frame portion 16a and the arm portion 150 (lower arm 156 in the present preferred embodiment) to each other. More specifically, the shock absorber 152 has an upper end region supported pivotably by an end region (left end region in the present preferred embodiment) of the cross member 58, whereas the shock absorber 152 has a lower end region supported pivotably by the lower arm 156.

Referring to FIG. 10, FIG. 12 and FIG. 13, the suspension assembly 98b is symmetrical with the suspension assembly 98a in a left-right direction, and includes an arm portion 160 and a shock absorber 162. In the present preferred embodiment, the arm portion 160 includes an upper arm 164, a lower arm 166 and a knuckle arm 168. Referring to FIG. 9, the upper arm 164 is supported by the support frame portions 54b, 56b pivotably in an up-down direction. The lower arm 166 is supported by the support frame portions 54b, 56b pivotably in an up-down direction at a lower position than the upper arm 164. More specifically, the upper arm 164 is supported at substantially intermediate regions in an up-down direction of the support frame portions 54b, 56b, whereas the lower arm 166 is supported by lower end regions of the support frame portions 54b, 56b. The shock absorber 162 connects the main frame portion 16a and the arm portion 160 (lower arm 166 in the present preferred embodiment) to each other. More specifically, the shock absorber 162 has an upper end region supported pivotably by another end region (right end region in the present preferred embodiment) of the cross member 58, whereas the shock absorber 162 has a lower end region supported pivotably by the lower arm 166.

Referring to FIG. 10, the rear stabilizer 102 is at a more forward position than the shock absorbers 152, 162, and connects the arm portion 150 of the suspension assembly 98a and the arm portion 160 of the suspension assembly 98b to each other. In the present preferred embodiment, the rear stabilizer 102 connects the upper arm 154 and the upper arm 164 to each other.

Figure 14:
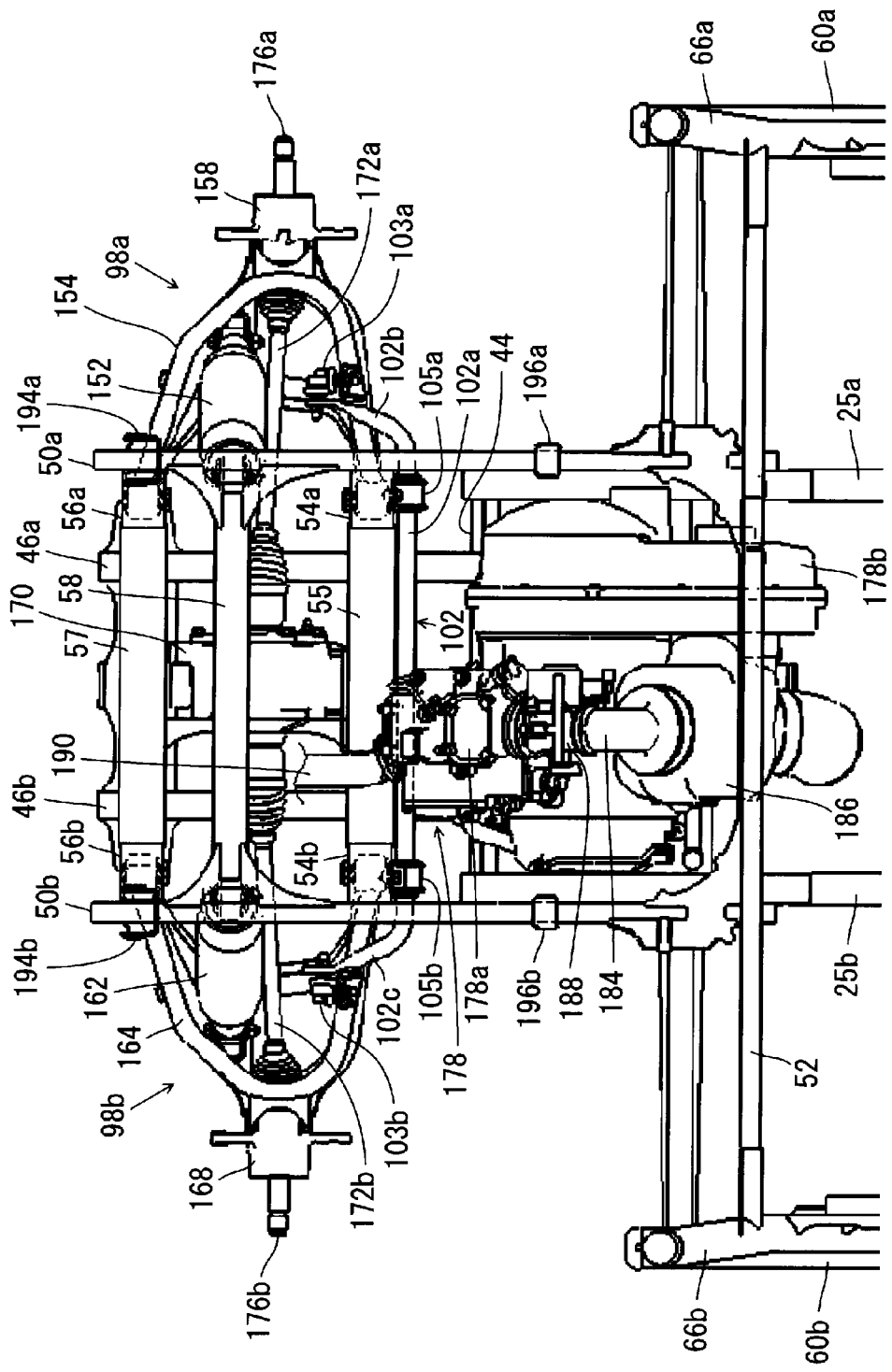
FIG. 14 is a plan view showing a rear region of the main frame portion, the pair of suspension assemblies for rear wheels, the rotation transmission portion for the rear wheels, etc.
Figure 15:
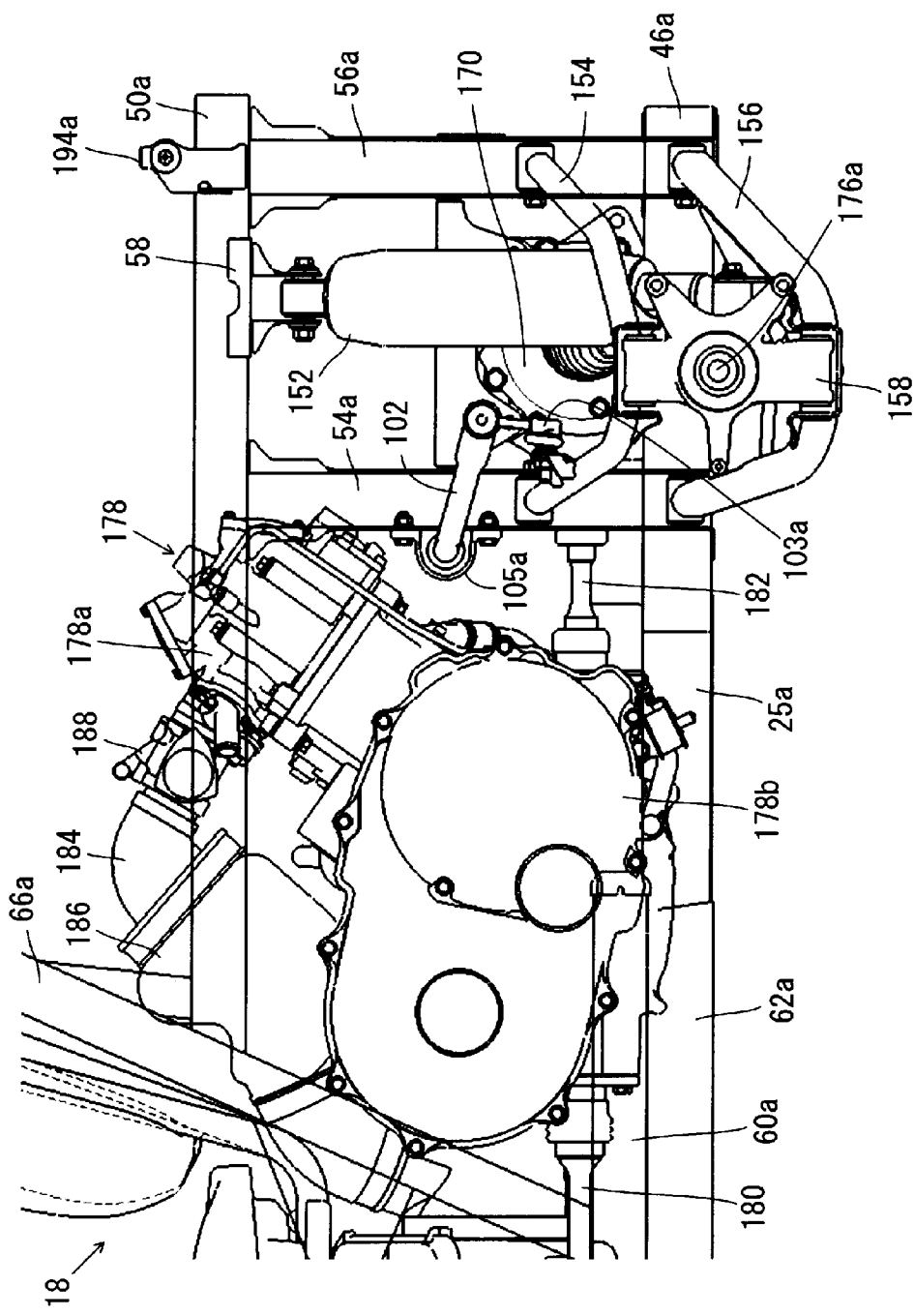
FIG. 15 is a side view showing the rear region of the main frame portion, the pair of suspension assemblies for rear wheels, the rotation transmission portion for the rear wheels, etc.

Referring to FIG. 14 and FIG. 15, the rear stabilizer 102 overlaps the engine 178 in a plan view, being disposed at a higher position than a lower end of the engine 178 yet to pass below the engine 178. Further, the rear stabilizer 102 is disposed behind a transmission case 178b, which will be described later, at a lower position than an upper end of the transmission case 178b yet at a higher position than a lower end of the transmission case 178b. Also, the rear stabilizer 102 passes above a propeller shaft 182.

Referring also to FIG. 12 and FIG. 13, the rear stabilizer 102 includes a torsion bar portion 102a extending in the width direction of the vehicle 10; a first end portion 102b connecting an end region (left end region) of the torsion bar portion 102a and the suspension assembly 98a to each other; and a second end portion 102c connecting another end region of the torsion bar portion 102a and the suspension assembly 98b to each other. Specifically, the first end portion 102b of the torsion bar portion 102a is connected to the flange portion 154a of the upper arm 154 via a connecting member 103a. The second end portion 102c of the torsion bar portion 102a is connected to the flange portion 164a of the upper arm 164 via a connecting member 103b. The torsion bar portion 102a overlaps the engine 178 in a plan view, passing below the engine 178. The torsion bar portion 102a is supported by the pair of support frame portions 54a, 54b. Specifically, the torsion bar portion 102a is fixed to substantially intermediate regions in an up-down direction of the support frame portions 54a, 54b by mounting members 105a, 105b.

Referring to FIG. 10, FIG. 12 and FIG. 13, the rotation transmission portion 100 includes a differential device 170, a pair of drive shafts 172a, 172b, a pair of constant-velocity joints 174a, 174b, and a pair of axles 176a, 176b. The differential device 170 is between the suspension assembly 98a and the suspension assembly 98b in the width direction of the vehicle 10. Without going into detail, the differential device 170 is supported by the main frame portion 16a. The differential device 170 is connected to the engine 178 (see FIG. 14 and FIG. 15) which will be described later, via the propeller shaft 182 (see FIG. 15) which will be described later.

The drive shafts 172a, 172b extend in the width direction of the vehicle 10, connecting the differential device 170 to the constant-velocity joints 174a, 174b. The constant-velocity joint 174a and the axle 176a are connected to each other and are supported rotatably by the knuckle arm 158. The constant-velocity joint 174b and the axle 176b are connected to each other and are supported rotatably by the knuckle arm 168. The axle 176a supports the left rear wheel (see FIG. 5), whereas the axle 176b supports the right rear wheel 14 (see FIG. 5).

Referring to FIG. 14 and FIG. 15, the engine 178 is supported at a rearward region of the main frame portion 16a. Referring to FIG. 7, FIG. 14 and FIG. 15, a majority of the engine 178 is located within a space surrounded by the side frame portions 25a, 25b, the side frame portions 46a, 46b, the support frame portions 48a, 48b, the side frame portions 50a, 50b, and the support frame portions 54a, 54b. The engine 178 is at a position behind the seat unit 18 and below the cargo bed 24, being slightly tilted rearward. In the present preferred embodiment, at least a portion of the engine 178 is at a more rearward position than the roll-over protection cage 22. The engine 178 includes a cylinder portion 178a and a transmission case 178b which is integrated with the cylinder portion 178a.

Referring to FIG. 15, at a substantially intermediate region in the width direction of the vehicle 10, the propeller shaft 180 extends forward from a lower end region of the engine 178, whereas the propeller shaft 182 extends rearward from a lower end region of the engine 178. Therefore, the propeller shaft 182 extends in a fore-aft direction in a more rearward region than the engine 178.

The propeller shaft 180 is connected to the differential device 142 (see FIG. 10), whereas the propeller shaft 182 is connected to the differential device 170 (see FIG. 10). Referring to FIG. 11 and FIG. 15, rotation from the engine 178 is transmitted by the propeller shaft 180, the differential device 142, the drive shafts 144a, 144b, the constant-velocity joints 146a, 146b, and the axles 148a, 148b, to the pair of front wheels 12. Thus, the pair of front wheels 12 are rotated. Also, referring to FIG. 12 through FIG. 15, rotation from the engine 178 is transmitted by the propeller shaft 182, the differential device 170, the drive shafts 172a, 172b, the constant-velocity joints 174a, 174b, and the axles 176a, 176b, to the pair of rear wheels 14. Thus, the pair of rear wheels 14 are rotated.

Referring to FIG. 14 and FIG. 15, an air cleaner 186 is connected to the cylinder portion 178a of the engine 178 via an air intake tube 184. The air cleaner 186 is at a position forward of the engine 178. The air intake tube 184 is provided with a throttle body 188. The cylinder portion 178a is connected to a muffler 192 (see FIG. 2 and FIG. 5) via an exhaust pipe 190.

The vehicle 10 further includes a transfer mechanism (not illustrated) which transmits movements of the steering wheel 20 to the pair of front wheels 12. The transfer mechanism can be any known mechanism such as a rack and pinion type transfer mechanism, for example, and therefore will not be described herein.

Referring to FIG. 2, FIG. 6 and FIG. 7, the pair of side frame portions 50a, 50b which extend in a fore-aft direction below the cargo bed 24 include a pair of first supporting portions 194a, 194b which support a rear portion of the cargo bed 24 pivotably; and a pair of second supporting portions 196a, 196b which are at a more forward position than the pair of first supporting portions 194a, 194b and support a forward portion of the cargo bed 24. Thus, the cargo bed 24 is supported by the frame portion 16 pivotably in an up-down direction behind the roll-over protection cage 22.

According to the vehicle 10 described thus far, the rear stabilizer 102 passes in front of the pair of shock absorbers 152, 162. In this case, a portion of the rear stabilizer 102 which is in front of the pair of shock absorbers 152, 162 is sufficiently spaced away in a forward direction, from a rearward end region of the vehicle 10. Thus, this arrangement significantly reduces or prevents exposure of the rear stabilizer 102 to external forces from behind. The rear stabilizer 102 is disposed to overlap the engine 178 in a plan view. In this case, there is no need for the rear stabilizer 102 and the engine 178 to be spaced away from each other in a fore-aft direction, and therefore there is no need to increase a fore-aft dimension of the vehicle 10. As a result of these, the vehicle 10 is compact and significantly reduces or prevents exposure of the rear stabilizer 102 to forces. The rear stabilizer 102 passes below the engine 178. This arrangement significantly reduces or prevents exposure of the rear stabilizer 102 to external forces from above while this arrangement also reduces or prevents layout complications above the engine 178.

The rear stabilizer 102 is disposed at a higher position than the lower end of the engine 178. Thus, the rear stabilizer 102 is sufficiently spaced away from the ground. This significantly reduces or prevents exposure of the rear stabilizer 102 to external forces from below.

The transmission case 178b, which is generally wider than the cylinder portion 178a, is in front of the rear stabilizer 102. This significantly reduces or prevents exposure of the rear stabilizer 102 to external forces from ahead.

Since the rear stabilizer 102 passes above the propeller shaft 182, the rear stabilizer 102 is sufficiently spaced away from the ground. This significantly reduces or prevents exposure of the rear stabilizer 102 to external forces from below.

The torsion bar portion 102a undergoes a twisting motion when it is operating. An amount of positional change in the torsion bar portion 102a is generally smaller than an amount of positional change of the first end portion 102b and an amount of positional change of the second end portion 102c. Therefore, it is easy to locate the torsion bar portion 102a close to the engine 178 in cases where the torsion bar portion 102a is disposed below the engine 178. In other words, the arrangement makes it possible to minimize a clearance between the rear stabilizer 102 and the engine 178 in a fore-aft direction. Therefore, there is no need to increase a fore-aft dimension of the vehicle 10.

The support frame portions 54a, 54b can be used to support the arm portions 150, 160, and to support the torsion bar portion 102a as well. Therefore, there is no need for any additional frame elements to support the torsion bar portion 102a. This allows the frame portion 16 to have a simple configuration.

In the preferred embodiments described above, description was made for a case where the vehicle 10 preferably includes a pair of rear wheels 14. However, the vehicle may include two or more pairs of rear wheels.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
a pair of rear wheels;
a frame portion;
a roll-over protection cage supported by the frame portion;
a pair of suspension assemblies at a rear region of the frame portion to suspend the pair of rear wheels;
an engine supported by the frame portion and including a cylinder portion, with at least a portion of the engine being at a more rearward position than the roll-over protection cage; and
a rear stabilizer connecting the pair of suspension assemblies to each other; wherein
each of the pair of suspension assemblies includes an arm portion supported pivotably by the frame portion, and a shock absorber connecting the arm portion and the frame portion to each other; and
the rear stabilizer overlaps the engine in a plan view, passing in front of the pair of shock absorbers and below the cylinder portion of the engine.

2. The vehicle according to claim 1, wherein the rear stabilizer is at a higher position than a lower end of the engine.

3. The vehicle according to claim 2, wherein
the engine includes a transmission case integrated with the cylinder portion; and
the rear stabilizer is behind the transmission case, at a lower position than an upper end of the transmission case and at a higher position than a lower end of the transmission case.

4. The vehicle according to claim 1, further comprising:
a propeller shaft extending in a fore-aft direction in a more rearward region than the engine and rotated by a driving force from the engine; and
a pair of drive shafts extending in a width direction of the vehicle and transmitting rotation from the propeller shaft to the pair of rear wheels; wherein
the rear stabilizer passes above the propeller shaft.

5. The vehicle according to claim 1, wherein
the rear stabilizer includes a torsion bar portion extending in a width direction of the vehicle;
a first end portion connecting an end region of the torsion bar portion to one of the suspension assemblies;
a second end portion connecting another end region of the torsion bar portion to the other suspension assembly; and
the torsion bar portion overlaps the engine in a plan view, passing below the engine.

6. The vehicle according to claim 5, wherein
the frame portion includes a pair of support frame portions supporting the pair of arm portions and extending in an up-down direction; and
the torsion bar portion is supported by the pair of support frame portions.

* * * * *